United States Patent [19]

Takeshita et al.

[11] 4,178,989
[45] Dec. 18, 1979

[54] SOLAR HEATING AND COOLING SYSTEM

[75] Inventors: Isao Takeshita; Nobuhiko Wakamatsu; Eiji Ando; Hiroyoshi Tanaka; Shiro Hozumi, all of Kadoma, Japan

[73] Assignee: Matsushita Electric Industrial Co., Ltd., Kadoma, Japan

[21] Appl. No.: 896,492

[22] Filed: Apr. 14, 1978

[30] Foreign Application Priority Data

Apr. 15, 1977 [JP] Japan .................................. 52-53925
Jan. 27, 1978 [JP] Japan .................................. 53-8755

[51] Int. Cl.$^2$ ........................................... F25B 13/00
[52] U.S. Cl. ............................................ 165/62; 62/2; 62/476; 62/324
[58] Field of Search .............. 62/2, 476, 238 B, 324 B; 165/62

[56] References Cited

U.S. PATENT DOCUMENTS

| | | | |
|---|---|---|---|
| 1,993,300 | 3/1935 | Randel | 165/62 X |
| 2,272,871 | 2/1942 | McGrath | 62/324 B X |
| 2,814,468 | 11/1951 | Berry | 165/62 |
| 2,818,234 | 12/1957 | Berry | 165/62 |
| 3,242,679 | 3/1966 | Puckett et al. | 62/2 |
| 4,011,731 | 3/1977 | Meckler | 62/2 |
| 4,023,375 | 5/1977 | Chinnappa et al. | 62/2 |
| 4,070,870 | 1/1978 | Bahel et al. | 62/2 |

OTHER PUBLICATIONS

Moore and Farber, "Combining the Collector and Generator of a Solar Refrigeration System", American Society of Mechanical Engineers, 76WA/Sol-4, Nov. 1967.
Refrigeration and Air Conditioning, Jun. 1977, p. 43, "A Solar Powered Ice Maker".

*Primary Examiner*—William F. O'Dea
*Assistant Examiner*—William E. Tapolcai, Jr.
*Attorney, Agent, or Firm*—Lowe, King, Price & Becker

[57] ABSTRACT

A system to accomplish both air cooling and air heating of indoor space by utilizing solar energy. In principle the disclosed system is an absorption refrigeration system, wherein a solution of an evaporable refrigerant in a less evaporable solvent is passed through a solar collector-generator, but the system has additional fluid passages with the provision of changeover valves arranged so as to pass the refrigerant in heated and vaporized state from the collector-generator to an indoor heat exchanger, bypassing the condenser of the refrigerator, thereby to accomplish air heating and return the refrigerant in liquid state from the heat exchanger to the collector-generator, bypassing the absorber of the refrigerator.

5 Claims, 4 Drawing Figures

SOLAR HEATING AND COOLING SYSTEM

BACKGROUND OF THE INVENTION

This invention relates to a system which utilizes solar energy for air heating and air cooling of indoor spaces, and more particularly to a system which comprises an absorption refrigerator operating with solar radiation as its heat source but also serves as a solar heating system practicable in winter.

Extensive research and development have been continued in various branches of technologies relating to the conservation of conventional energy sources and utilization of nonconventional energy sources, and particularly much attention has been given to the use of solar energy for air heating and air cooling (air conditioning) of indoor spaces.

In solar heating and cooling systems, development of high efficiency collectors to collect heat from solar radiation is one of main technological tasks, and reduction of heat loss during the transfer of heat from a solar collector which is usually placed on the roof of a building to other components is another important task. From a practical viewpoint, it is also important that the use of a solar system affords a fuel saving large enough to pay back initial investments to the solar system in a satisfactorily short time. In this regard, it is quite desirable that a solar system can accomplish both air heating and air cooling because then the amount of fuel or money saving per year can be increased.

At present the use of solar energy for air cooling or air conditioning is made almost always by means of either a vapor compression refrigerator or an absorption refrigerator. In the former case, hot water (or an organic heating medium) supplied from a solar collector is used to generate a high pressure vapor of a refrigerant such as Freon, with which a Rankine cycle engine of the refrigerator is operated. A solar system of this type can operate with high efficiency only if use is made of a highly efficient solar collector since the thermal efficiency of the compression refrigerator is unsatisfactory and below than that of an absorption refrigerator when the temperature of the heating medium does not exceed about 100° C. In the case of an absorption refrigerator system in which usually water and lithium bromide are employed respectively as refrigerant and absorber, hot water (or an organic heating medium) provided by a solar collector serves as the heat source for operation of the refrigerator. This type of solar cooling system too requires that the heating medium is heated to a considerably high temperature. It is possible to use this type of system also as a solar heating system, but the temperature requirement to the heating medium for heating operation is almost similar to that for cooling operation. Since it is difficult to realize such a high temperature in winter, an absorption refrigerator system is rarely practiced as a solar heating system.

In view of the performance of solar collectors currently available, the present invention is concerned with an absorption refrigerator system. To aid understanding of the invention, an explanation of conventional solar systems of the absorption refrigeration type will be given hereinafter with reference to FIGS. 1 and 2 of the accompanying drawings.

DESCRIPTION OF THE PRIOR ART

Figure 1:
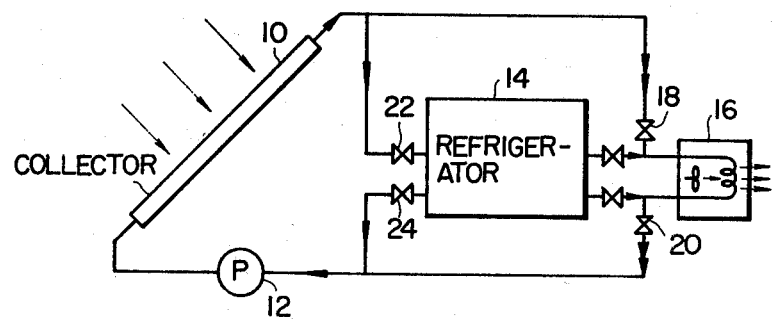
FIG. 1 is a schematic diagram of a conventional solar heating and cooling system.

FIG. 1 shows a conventional system to utilize solar energy for both air heating and air cooling as an example of conventional systems of the type having a solar collector to collect heat from solar radiation and an absorption refrigerator as their fundamental components. In this system water (or an organic heating medium) is circulated through a solar collector 10 by means of a circulating pump 12 to convert solar radiation into sensible heat of the water. An absorption refrigerator 14 of this system utilizes, for example, water as the refrigerant and lithium bromide as the absorber. In cooling operation, the heated water is supplied to the generator of the refrigerator 14 to generate heated vapor of the refrigerant, and the vapor is expanded in the refrigerator 14 to cool water that is circulated through an indoor heat exchanger 16. The piping of this system is made such that water can be circulated by means of the pump 12 through the solar collector 10 and the indoor heat exchanger 16 by opening two valves 18 and 20. In the case of operating this system as an air heating system the fluid communication of the refrigerator 14 with both the collector 10 and the heat exchanger 16 is blocked by closing valves 22 and 24 in the hot water line and valves 26 and 28 in the cold water line, and instead the aforementioned valves 18 and 20 are opened. Then heat collected in the collector 10 is transferred as sensible heat of the circulating water directly to the heat exchanger 16, and after emission of heat the water is returned to the collector 10.

A disadvantage of this system in regard of its cooling cycle is a considerably large heat loss originating in the necessity of supplying hot water from the collector 10 to the generator of the absorption refrigerator 14 at a temperature about 10° C. above the operating temperature of the generator. Heating cycle too suffers an appreciable heat loss because heat is transferred as sensible heat of the heated water. As an additional disadvantage, the operation of this system consumes a relatively large amount of auxiliary power for driving the circulating pump 12, which needs to be relatively large in capacity, and several components of the refrigerator 14.

To realize more efficient solar cooling by an absorption refrigerator system, it has been proposed to utilize a solar collector also as the generator of an absorption refrigerator.

Figure 2:
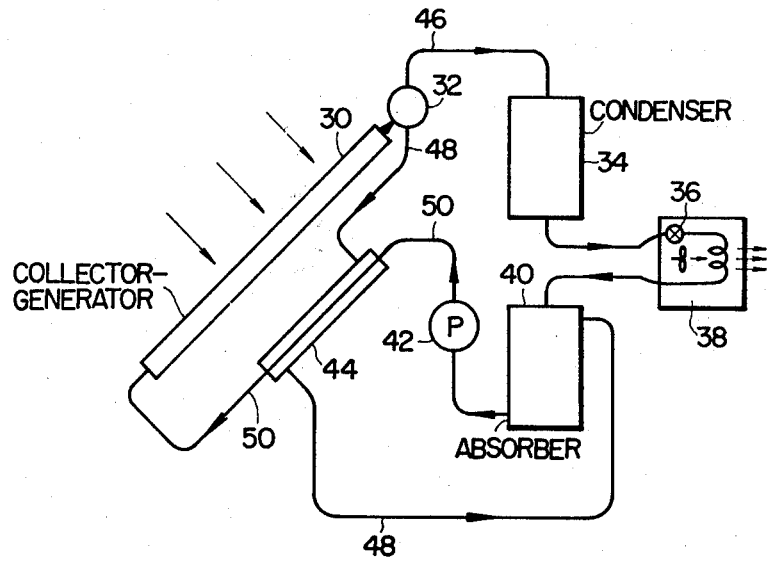
FIG. 2 is a schematic diagram of a conventional solar cooling system.

FIG. 2 shows a conventional cooling system as an embodiment of such a proposal. A solar collector 30 that serves also as the generator of an absorption refrigerator is arranged at a suitable inclination above the horizontal with its liquid inlet at the bottom and an outlet at the top. Other components of this system are a vapor-liquid separator 32, a condenser 34, an indoor unit including an expansion valve 36 and an evaporator or heat exchanger 38 for air cooling, an absorber 40, a liquid circulating pump 42 and a heat exchanger 44.

In operation, a concentrated or strong solution of a refrigerant in a solvent (e.g. a solution of Freon R-22 in dimethylformamide) is introduced into the collector-generator 30 through the bottom inlet. Heating of this solution by solar radiation causes evaporation of the refrigerant, so that a mixture of the refrigerant vapor and a diluted or weak solution leaves the collector-generator 30 through the top outlet and enters the vapor-liquid separator 32. The refrigerant vapor alone is passed through line (pipe) 46 to the condenser 34, wherein the vapor is condensed into liquid using water or air for cooling. The condensed refrigerant is allowed to expand in the expansion valve 36 and then vaporizes in the heat exchanger 38 to lower the indoor temperature by extraction of heat from indoor air as latent heat of vaporization of the refrigerant. Thereafter the vaporized refrigerant is admitted into the absorber 40.

Meanwhile, the weak solution flows through line 48 from the vapor-liquid separator 32 into the heat exchanger 44, wherein heat is transferred from the hot and weak solution to the cold and strong solution flowing from the absorber 40 to the inlet of the collector-generator 30. Accordingly the weak solution is returned to the absorber 40 in a cooled state. In the absorber 40 the weak solution absorbs the vaporized refrigerant to revert to the strong solution. Since heat is evolved by the absorption, the solution in the absorber 40 is cooled by water or air so that the strong solution may leave the absorber 40 at temperatures near room temperature. The use of the circulating pump 42 is necessary for conveyance of the strong solution to the collector-generator 30 because of a lower pressure in the absorber 40 than in the collector-generator 30. The strong solution is preheated in the heat exchanger 44 before admission into the collector-generator 30.

The system of FIG. 2 is unquestionably advantageous in that heat loss is lessened and the circulating pump 42 is a sole component which needs the supply of auxiliary power.

However, this system serves only as a cooling system: in the illustrated construction it cannot operate as a heating system. As is well known, a cooling system using a compression refrigerator can be turned into a heating system by reversing the functions of its condenser and evaporator so as to constitute a heat pump. Theoretically, it is possible to make a similar use of the above described absorption refrigeration system, but practically it is impossible to accomplish satisfactory heating operation by such a technique because, in winter, the temperature rise in the collector-generator remains insufficient. (In the case of using a solution of Freon R-22 in DMF, the solution needs to be heated to 100° C. or above to assure proper operation). Even if it is intended to accomplish air heating by making direct use of sensible heat of the heated refrigerant vapor obtained by supplying the aforementioned solution to the collector-generator, still it is necessary, but hard to realize, to raise the temperature of the solution above about 90° C., i.e. above the critical temperature for this refrigerant vapor.

SUMMARY OF THE INVENTION

It is an object of the present invention to provide a practicable system which can accomplish both air heating and air cooling of indoor space by utilizing solar energy.

It is another object of the invention to provide a solar cooling and heating system which is based on the absorption refrigeration system of FIG. 2 but serves also as a solar heating system high enough in heat utilization efficiency to practical use even in winter.

A solar heating and cooling system according to the invention comprises: a solar collector to heat a liquid passing therethrough by solar radiation; a liquid circulating means for circulating a solution of an evaporable refrigerant in a less evaporable solvent through the solar collector; and an absorption refrigeration system including a vapor-liquid separator connected to an outlet of the collector, a condenser for condensation of a heated vapor of the refrigerant, an expansion valve for evaporation of the condensed refrigerant, an indoor heat exchanger for heat exchange between the evaporated refrigerant and air and an absorber in which the evaporated refrigerant is absorbed in the solvent. The solar collector serves also as a vapor generator of the absorption refrigeration system. These components are connected by the following fluid passages: a first passage connecting the vapor-liquid separator to an inlet of the indoor heat exchanger through the condenser and the expansion valve; a second passage connecting an outlet of the indoor heat exchanger to an inlet of the collector through the absorber; a third passage to return unvaporized portion of the solution from the vapor-liquid separator to the absorber; a fourth passage which connects the vapor-liquid separator to the inlet of the indoor heat exchanger and bypasses the condenser and the expansion valve; and a fifth passage which connects the outlet of the indoor heat exchanger to the inlet of the collector and bypasses the absorber. These fluid passages are provided with first valve means for selectively blocking one of the first passage and the fourth passage, second valve means for selectively blocking one of the second passage and the fifth passage such that the second passage is blocked when the first passage is blocked and third valve means for blocking the third passage when the second passage is blocked.

When the fourth and fifth passages are blocked, the entire system operates as a solar cooling system of the absorption refrigeration type. When the first, second and third passages are blocked, the refrigerant is passed in heated and vaporized state from the collector-generator directly to the indoor heat exchanger through the fourth passage and returned in liquid state from the heat exchanger to the collector-generator through the fifth passage, so that the system operates as a solar heating system.

A fluorine-containing hydrocarbon (1 or 2 carbon atoms) refrigerant is of use as the refrigerant for this system.

DESCRIPTION OF PREFERRED EMBODIMENTS

Figure 3:
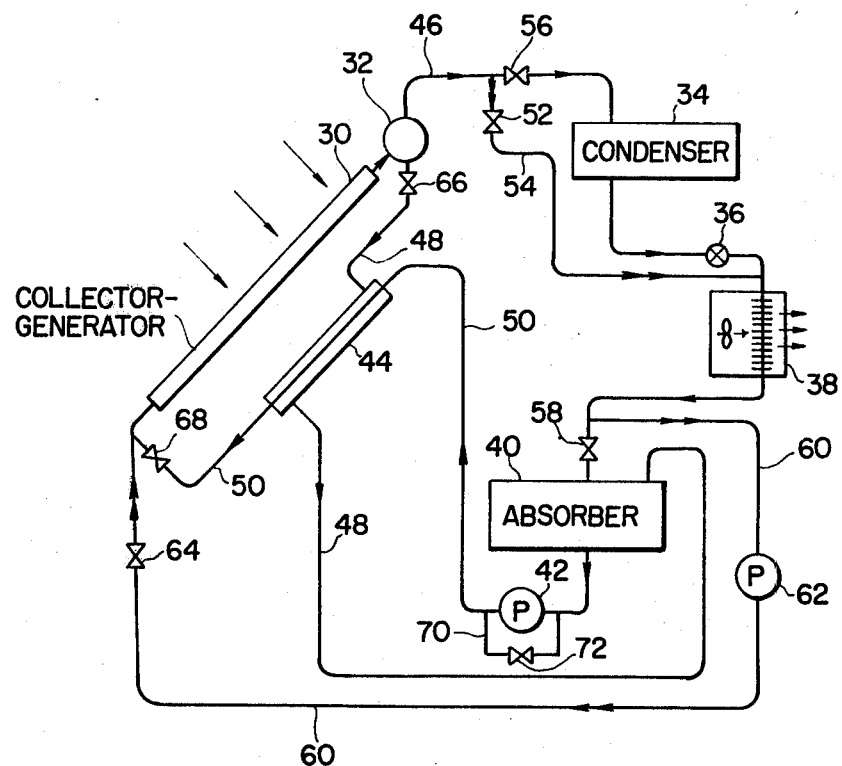
FIG. 3 is a schematic diagram of a solar heating and cooling system as an embodiment of the present invention.

FIG. 3 shows a fundamental construction of a solar heating and cooling system according to the invention. This system includes all the elements of the above described conventional system of FIG. 2: solar collector-generator 30, vapor-liquid separator 32, condenser 34, expansion valve 36, indoor heat exchanger 38, absorber 40, liquid circulating pump 42 and heat exchanger 44 are identical with the corresponding ones in the system of FIG. 2 both in individual function and arrangement.

The difference of the system of FIG. 3 from that of FIG. 2 resides in the following points. A fluid passage (pipe) 54 branches from the vapor passage 46 so as to bypass the condenser 34 and the expansion valve 36 and connect the vapor outlet of the separator 32 to the inlet of the indoor heat exchanger 38, and valves 56 and 52 are provided respectively in the vapor passage 46 and the bypass passage 54 so that the separator 32 may be connected to the indoor heat exchanger through either of the two passages 46 and 54. A fluid passage 60 is arranged to connect the outlet of the indoor heat exchanger 38 to the inlet of the collector-generator 30 without passing through the absorber 40 and the heat exchanger 44, and a pump 62 is provided in this passage 60 for conveyance of liquid from the indoor heat exchanger 38 to the collector-generator 30. The passage 50 is provided with a valve 58 at a section upstream of the absorber 40 and the supplemented passage 60 is provided with a valve 64 between the pump 62 and the collector-generator 30 so that the indoor heat exchanger 38 can be connected to the inlet of the collector-generator 30 through either of the two passages 50 and 60. In addition, a valve 66 is provided in the liquid passage 48 between the separator 32 and the heat exchanger 44, and a valve 68 in the passage 50 between the heat exchanger 44 and the inlet of the collector-generator 30. As another additional to the liquid passage 50, the pump 42 is bypassed by a passage 70 with the provision of a bypass valve 72. These additionals are all for the sake of affording a solar heating function to the system of FIG. 2, a solar cooling system.

Initially the absorber 40 is filled with a strong solution of an evaporable refrigerant in a less evaporable solvent, for example a solution consisting of 60–70 Wt% of Freon-22 ($CHClF_2$) and the balance of dimethylformamide, and all the fluid passages are once evacuated and then filled with the gas of the refrigerant (Freon-22).

In the case of operating this system as a cooling system, the valves 56, 58, 66 and 68 are kept open while the valves 52, 64 and 72 are kept closed with the result that the system of FIG. 3 does not substantially differ from the system of FIG. 2. Accordingly, cooling cycle for this system is exactly as described hereinbefore with reference to FIG. 2. Both the condenser 34 and the absorber 40 are maintained at temperatures between about 30° and 40° C. by either cooling water or air. The strong solution is supplied from the absorber 40 to the solar collector-generator 30 through the passage 50 by means of the circulating pump 42. When the aforementioned Freon-22 solution in DMF was heated to 80°–90° C. in the collector-generator 30 by solar radiation, Freon-22 gas entered the condenser 34 through the passage 46 at a pressure of about 16 kg/cm$^2$. After condensation, the refrigerant enters the indoor heat exchanger 38 through the expansion valve 36 and evaporates rapidly, extracting a large amount of heat from the indoor air as latent heat of vaporization. The resultant Freon-22 gas flows into the absorber 40 through the valve 58. The weak solution returns from the vapor-liquid separator 32 to the absorber 40 through the heat exchanger 44. Since the absorber 40 is cooled to about 30°–40° C., the pressure in the absorber 40 remains relatively low. When the pressure of the Freon-22 gas generated by the collector-generator 30 was about 16 kg/cm$^2$, the pressure in the absorber 40 was about 6 kg/cm$^2$, meaning the existence of about 10 kg/cm$^2$ pressure difference between the entrance and exit of the expansion valve 36. In the absorber 40 the weak solution absorbes the Freon-22 gas to revert into the strong solution.

When there is no longer the need of operating the system of FIG. 3 as a cooling system as in autumn, the system can be switched over to a solar heating system by the following procedure. Operating the system in the above described cooling mode, the expansion valve 36 is closed in order to accumulate the condensed refrigerant in the condenser 34. When the quantity of the refrigerant in the condenser 34 reached a quantity needed for heating cycle, the valve 56 of the vapor passage 46 is closed, and then the operation of the pump 42 is stopped and the bypass valve 72 is opened. Then the solution in the collector generator 30 and the liquid passage 50 makes a reverse flow to the absorber 40 due to the pressure difference between the collector-generator 30 and the absorber 40, while the weak solution returns to the absorber 40 through the passage 48. Upon completion of the recovery of the solution into the absorber 40, the valves 58, 66 and 68 are closed and the valves 52 and 64 are opened, resulting in that the system stops its operation and that a closed loop fluid circuit is given through the collector-generator 30, vapor-liquid separator 32, valve 52, passage 54, indoor heat exchanger 38, passage 60, pump 62 and valve 64.

At the start of heating mode operation, the expansion valve 36 is fully opened and the pump 62 is run to feed the refrigerant liquid stored in the condenser 34 to the collector-generator 30 through the indoor heat exchanger 38 and the passage 60. Since the refrigerant liquid is neither heated nor pressurized at this stage, the liquid passes through the expansion valve 36 and the heat exchanger 38 without vaporizing. The valve 36 is closed when a sufficient quantity of the refrigerant liquid entered the collector-generator 30 and the passage 60. Solar radiation to the collector-generator 30 causes evaporation of the refrigerant liquid, and the resultant refrigerant gas passes through the valve 52 and the passage 54 in a hot and pressurized state and enters the indoor heat exchanger 38. Due to a relatively low temperature of the indoor air in this case, the refrigerant gas undergoes condensation in the heat exchanger 38 giving up its heat of condensation to the indoor air. The condensed refrigerant is conveyed to the collector-generator 30 through the passage 60 by the pump 62, so that a heating cycle is completed.

Thus the evaporable substance hereinbefore called "refrigerant" serves as a heating medium during heating mode operation of the system of FIG. 3. The heating cycle for this system features a high thermal efficiency since in this cycle heat is transferred from the collector-generator 30 to the indoor heat exchanger 38 as latent heat of the heating medium.

Needless to mention, the temperature in the gas passage (passage 54 and a portion of passage 46) for the heating cycle must be maintained above the temperature in the indoor heat exchanger 38. Accordingly heat insulation is needed to the outdoor piping that constitutes the fluid circuit (passages 54 and 60, and a portion of passage 46) for the heating mode operation.

When the outdoor temperature was 6° C. and the intensity of solar radiation to the collector-generator 30 was 550 Kcal/m$^2$, Freon-22 was heated to about 45° C. in the collector-generator 30 during heating mode operation of the system of FIG. 3, and nearly the same temperature was maintained in the indoor heat exchanger 38. As the result air flowing over the indoor heat exchanger 38 could be warmed to about 35° C.

Since little pressure difference exists in the entire system during its heating mode operation, the pump 62 is not required of a high pumping ability (in comparison, the pump 42 for use in the cooling mode operation must have the ability of pumping up the solution from the absorber 40 where pressure is relatively low to the collector-generator 30 where pressure becomes higher.)

It is desirable that the refrigerant alone is circulated during heating mode operation, but in practice the coexistence of a very small quantity of the solvent with the refrigerant, meaning an incompleteness of the discharge of the solvent from the collector-generator 30 preparatory to the heating cycle, is permissible.

The functional switchover of the system of FIG. 3 from a heating system to a cooling system is made as follows. First the valve 36 is closed and the refrigerant liquid in the passage 60 is pumped into the collector-generator 30 by the pump 62. Then the valve 64 is closed, and the operation of the pump 62 is stopped. Thereafter the valves 52 and 72 are closed, and the valves 36, 56, 58, 66 and 68 are opened.

As will have been understood from the foregoing description, the invention has succeeded in providing a fully practicable solar heating and cooling system by improving a known solar cooling system. The system according to the invention is quite convenient to the users because there is no need of exchanging the refrigerant-containing solution for a different heating medium at switchover of the function of the system from cooling cycle to heating cycle, and the switchover can be achieved substantially only by manipulation of several valves. Unlike conventional solar heating systems of the hot water type, the system of the invention utilizes latent heat of the heating medium (originally refrigerant), and accordingly has the advantage that heat loss in heating cycle is very small. The system of the invention, therefore, exhibits a strong heating power by circulation of a relatively small quantity of heating medium, meaning that a small electric power is suffice to pump the condensed heating medium. This system serves as a year-round air conditioning system and is highly efficient either as a cooling system or a heating system.

FIG. 3 shows the fundamentals of a system according to the invention, but the details may be modified in various ways. For example, use may be made of three-way valves to reduce the total number of valves in the system.

Figure 4:
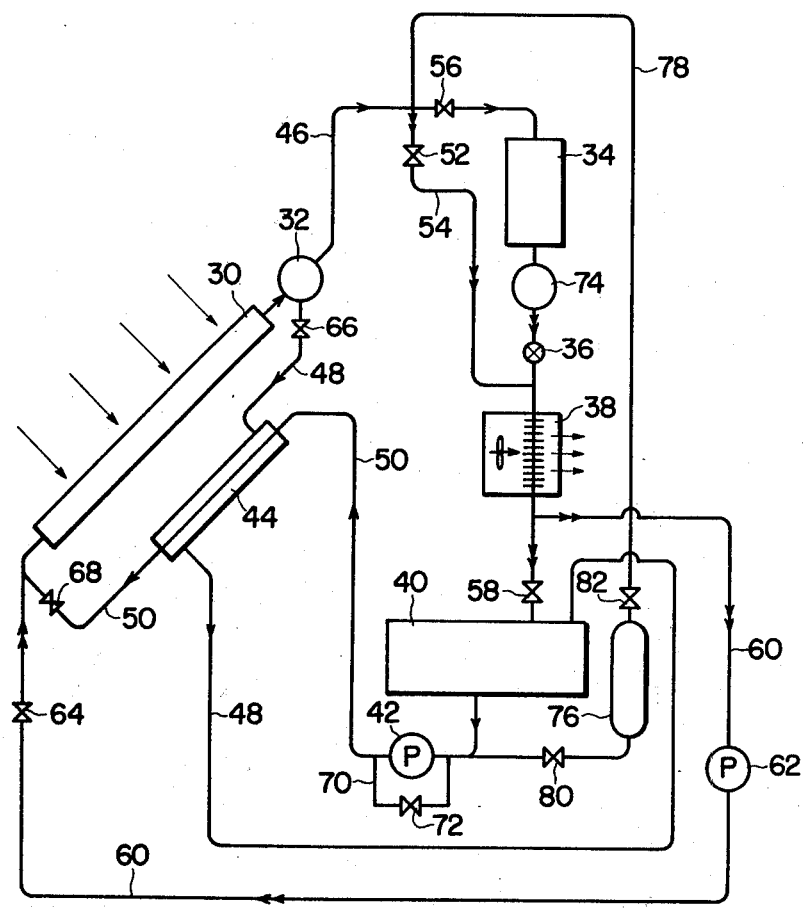
FIG. 4 is a schematic diagram showing a modification of the system of FIG. 3.

Referring to FIG. 4, two liquid reservoirs 74 and 76 may be added to the system of FIG. 3. As described hereinbefore, the refrigerant (which serves as heating medium in heating cycle) must be collected and stored in the condenser 34 in a quantity necessary for heating mode operation of the system of FIG. 3 during an interval between cooling mode and heating mode operations, and almost the entire quantity of the solvent (as a solution containing a certain amount of the refrigerant) must be stored in the absorber 40 during the same interval and subsequent heating mode operation. Accordingly, the condenser 34 and the absorber 40 need to have volumes of more than sufficient for their principal functions. The system of FIG. 4 does not fundamentally differ from that of FIG. 3 but is more convenient in this regard.

The solar heating and cooling system of FIG. 4 comprises all the elements of the system of FIG. 3. In addition, a reservoir 74 is interposed between the condenser 34 and the expansion valve 36 and another reservoir 76 is arranged in parallel with the absorber 40. The reservoir 76 is incorporated into the system by the provision of a fluid passage 78 which branches from the liquid passage 50 at a section between the absorber 40 and the pump 42 and joins the gas passage 46 at a section between the vapor-liquid separator 32 and the valve 56.

This passage 78 is provided with two valves 80 and 82 on both sides of the reservoir 76, respectively. The reservoir 74 has a capacity sufficient for storage of the refrigerant liquid in a quantity necessary for heating mode operation of the system, and the reservoir 76 has a capacity sufficient for storage of the solution left after extraction of the aforementioned quantity of the refrigerant.

The system of FIG. 4 operates as a solar cooling system in the same manner as the system of FIG. 3. In this case the two valves 80 and 82 are kept closed, so that the presence of the reservoir 76 or the passage 78 does not influence the operation. The reservoir 74 serves as a portion of the fluid passage 46 and is effective for smoothing the operation that relies on solar radiation, an intermittent or fluctuatable heat source.

To switch over this system from a cooling system to a heating system, the system is operated in cooling mode but with the valve 36 closed. Then the condensed refrigerant accumulates in the reservoir 74, not in the condenser 34. The valve 56 is closed and the operation of the pump 42 is stopped when a needful quantity of the refrigerant is contained in the reservoir 74. Thereafter the bypass valve 72 and the valves 80 and 82 in the supplemented passage 78 are opened, resulting in that the solution in the collector-generator 30 and the liquid passage 50 makes a reverse flow to the absorber 40 and the reservoir 76 due to the pressure difference between the collector-generator 30 and the absorber 40. Upon completion of the recovery of the solution by such reverse flow the valves 58, 66, 68, 80 and 82 are closed, and the valves 52 and 64 are opened. A major portion of the recovered solution can be introduced into the reservoir 76 by positioning the reservoir 76 lower than the absorber 40.

As to the heating mode operation there is no difference between the systems of FIGS. 3 and 4.

The switchover from a heating system to a cooling system is made as follows. The valves 36, 56, 58, 66 and 68 are opened with solar radiation to the collector-generator 30, and the valves 52 and 72 are closed. Then the pump 62 is run to force the refrigerant liquid in the passage 60 into the collector-generator 30 and then the valve 64 is closed. Thereafter the pump 42 is run to supply the solution to the collector-generator 30. The valves 80 and 82 are opened when the pressure in the gas passage 46 rises sufficiently, resulting in that the solution flows out of the reservoir 76 and enters the absorber 40 due to a lower pressure in the absorber 40. The switchover procedure is completed by closing thereafter the valves 80 and 82.

What is claimed is:

1. A solar heating and cooling system comprising:
   a solar collector to heat a liquid passing therethrough by solar radiation;
   means for circulating a solution of an evaporable refrigerant in a less evaporable solvent through said solar collector;
   an absorption refrigeration system including a vapor-liquid separator connected to an outlet of said collector, a condenser for condensation of a heated vapor of said refrigerant, an expansion valve through which the condensed refrigerant is introduced into an indoor heat exchanger for heat exchange between the refrigerant and air and an absorber in which the cooled refrigerant is absorbed in said solvent, said collector serving also as a vapor generator of said absorption refrigeration system;
a first fluid passage connecting said vapor-liquid separator to an inlet of said indoor heat exchanger through said condenser and said expansion valve;
a second fluid passage connecting an outlet of said indoor heat exchanger to an inlet of said collector through said absorber;
a third fluid passage to return unvaporized portion of said solution from said vapor-liquid separator to said absorber;
a fourth fluid passage which connects said vapor-liquid separator to said inlet of said indoor heat exchanger and bypasses said condenser and said expansion valve;
a fifth fluid passage which connects said outlet of said indoor heat exchanger to said inlet of said collector and bypasses said absorber;
first valve means for selectively blocking one of said first passage and said fourth passage;
second valve means for selectively blocking one of said second passage and said fifth passage such that said second passage is blocked when said first passage is blocked; and
third valve means for blocking said third passage when said second passage is blocked.

2. A solar heating and cooling system as claimed in claim 1, further comprising a refrigerant reservoir which occupies a section of said first passage between said condenser and said expansion valve and has a capacity sufficient for storage of said refrigerant in a quantity necessary for heating mode operation of the system.

3. A solar heating and cooling system as claimed in claim 1, further comprising a solution reservoir, a sixth fluid passage which interconnects said first passage to said second passage through said solution reservoir and bypasses said condenser, said expansion valve, said indoor heat exchanger and said absorber, and valve means for selectively opening and blocking said sixth passage, said solution reservoir having a capacity sufficient for storage of an excess portion of said solution during heating mode operation of the system.

4. A solar heating and cooling system as claimed in claim 1, further comprising a heat exchanger arranged to pass therethrough both said second and third passages.

5. A solar heating and cooling system as claimed in any of claims 1 to 4, wherein said refrigerant is a fluorine-containing hydrocarbon.

* * * * *